United States Patent [19]

Vilnrotter

[11] Patent Number: 4,648,133
[45] Date of Patent: Mar. 3, 1987

[54] SYNCHRONIZATION TRACKING IN PULSE POSITION MODULATION RECEIVER

[75] Inventor: Victor A. Vilnrotter, Glendale, Calif.

[73] Assignee: The Unites States of America as represented by the Administrator of the National Aeronautics and Space Administration, Washington, D.C.

[21] Appl. No.: 638,586

[22] Filed: Aug. 7, 1984

[51] Int. Cl.[4] .............................................. H04B 9/00
[52] U.S. Cl. .................................. 455/608; 329/107; 375/23; 375/110; 375/120
[58] Field of Search ..................... 455/608, 611; 370/8, 370/10, 108; 375/23, 110, 118, 120, 119; 371/32; 329/50, 107, 122

[56] References Cited

U.S. PATENT DOCUMENTS

| | | | |
|---|---|---|---|
| 3,142,806 | 7/1964 | Fernandez | 329/107 |
| 3,286,188 | 11/1966 | Castellano, Jr. | 329/122 |
| 3,501,705 | 3/1970 | Lukens, Jr. | 329/122 |
| 3,706,853 | 12/1972 | Saito et al. | 179/15 |
| 3,727,061 | 4/1973 | Dworkin | 250/199 |
| 3,767,855 | 10/1973 | Ueno et al. | 178/68 |
| 3,891,985 | 6/1975 | Olgarden et al. | 340/353 |
| 4,025,720 | 5/1977 | Pachynski, Jr. | 178/69.1 |
| 4,357,634 | 11/1982 | Chung | 360/40 |

OTHER PUBLICATIONS

Ueno et al, "A Semiconductor-Laser Communication System Using Differential Pulse Position Modulation", *Electronics & Communications in Japan*, vol. 55-C, No. 12, Dec. 1972, pp. 83-89.

*Primary Examiner*—Joseph A. Orsino, Jr.
*Attorney, Agent, or Firm*—Paul F. McCaul; John R. Manning; Thomas H. Jones

[57] ABSTRACT

A clock pulse generator for decoding pulse position modulation in an optical communication receiver is synchronized by a delay tacking loop which multiplies impulses of a data pulse by the square-wave clock pulses from the generator to produce positive impulses when the clock pulse is of one level, and negative impulses when the clock pulse is of another level. A delay tracking loop integrates the impulses and produces an error signal that adjusts the delay so the clock pulses will be synchronized with data pulses. A dead-time $\tau_d$ provided between data pulses of an interval $\tau_p$ in the data pulse period $\tau$. When synchronized, the average number of positive impulses integrated will equal the average number of negative impulses over the continuous stream of data pulses.

4 Claims, 9 Drawing Figures

SYNCHRONIZATION TRACKING IN PULSE POSITION MODULATION RECEIVER

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to pulse position modulation (PPM) of data for transmission over a channel, such as a fiber optic channel, and more particularly to a method and apparatus for synchronizing a receiver directly from the PPM stream without the use of decision aided feedback.

The PPM format for transmission of data is well suited for optical communication channels. In the PPM format, an interval is divided into a number, M, of slots or positions where a pulse of duration $\tau_p$ seconds may occur. For example, if M is equal to 256, each word represents 8-bits of information. Therefore, the transmission of binary valued PPM pulses is a very efficient method of transmitting data with optical pulses that can be generated at high rates, typically in the megahertz range.

At the receiver, a photomultiplier tube is used to detect the weak PPM optical pulses. The problem is that since pulse position in the M-ary PPM data stream is critical, it is necessary to synchronize the receiver and track the weak optical PPM signal. Heretofore there has been no method known for establishing pulse position (slot) synchronization directly from a detected optical M-ary PPM data stream without the use of decision aided feedback, and without significantly altering the performance (error probability or information rate) of the optical receiver.

SUMMARY OF THE INVENTION

In accordance with the present invention, the modulation format for PPM data is modified by including a small "dead-time" $\tau_d$ on each side of the optical pulse transmitted, and at the receiver an error signal is derived directly from the output of a photomultiplier tube (PMT) used as the optical pulse detector. A voltage-controlled local oscillator generates a square-wave clock pulse signal of period $\tau = 2\tau_d + \tau_p$ seconds. The detected pulses consist of randomly occurring photon impulses with a Poisson distribution in the pulse interval $\tau_p$. When multiplied by the square-wave clock pulse signal derived from the voltage-controlled local oscillator, the detected photon impulses are converted as a product of multiplication to positive impulses when the clock pulse signal is high, and negative impulses when the clock pulse signal is low. A delay tracking loop filter of the integrating type will then generate an error voltage signal that is either positive or negative as the delay of the clock pulse signal drifts. The error voltage signal is applied to the voltage-controlled clock generator to shift the clock pulse signal back in synchronism with the data pulse periods, $\tau$. For the synchronized condition, the square-wave clock pulse signal will be high for half the slot period and low for the other half, so the average number of positive impulses out of the multiplier will continually equal the average number of negative impulses. Thus, the average error signal will be zero. Any deviation from this balanced condition causes a correcting error signal to be generated by the loop filter.

The novel features of the invention are set forth with particularity in the appended claims. The invention will best be understood from the following description when read in conjunction with the drawings.

DESCRIPTION OF PREFERRED EMBODIMENTS

Figure 1:
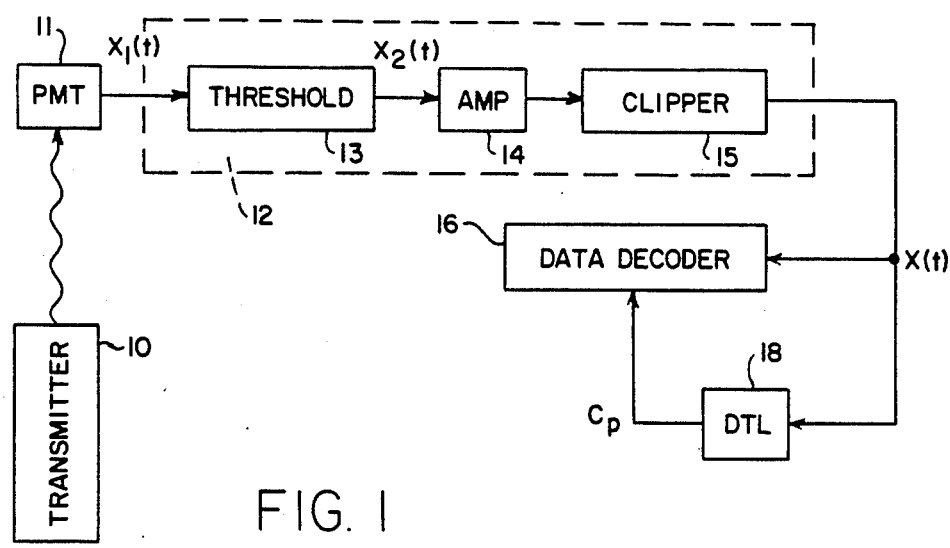
FIG. 1 is a block diagram of an optical PPM data receiver.
Figure 1A:
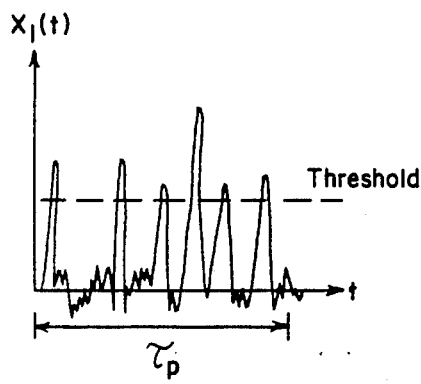
FIGS. 1a, 1b, and 1c illustrate the nature of electrical signals in the receiver channel at various points.
Figure 1B:
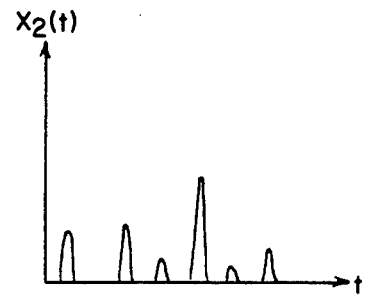
Figure 1C:
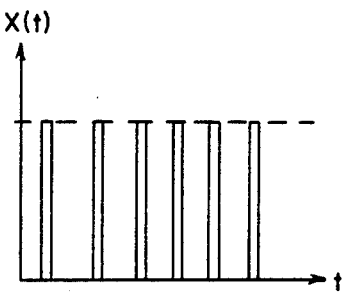

Referring to FIG. 1, an optical PPM signal is transmitted over an optical channel by a transmitter 10, and at the receiving end of the channel the PPM signal is detected by a photomultiplier tube (PMT) 11 at the front end of a receiver 12 comprised of a pulse threshold discriminator 13, amplifier 14, and clipper 15. FIG. 1a illustrates the nature of the impulses produced by the PMT in response to detection of photons in a data pulse received. Each impulse represents a photon transmitted during a data pulse of a period $\tau_p$. Because the impulses are of varying height, and are typically accompanied by thermal noise in the signal, the threshold detector 13 is employed to eliminate all but the tops of the impulses, as illustrated in FIG. 1b. These noise free impulses are then amplified and clipped to produce impulses of uniform amplitude. Each group of impulses representing a PPM data pulse is translated by a decoder 16 into a number of bits N related to the pulse slot position in a number M of PPM slots by the log of M to the base 2, i.e., $\log_2 M = N$. For M equal to 256, N equals 8.

In order to translate the PPM slot position into an N-bit word, the receiver must have a clock pulse $\dot{C}_p$ synchronized with the data pulse time slots. That is accomplished in a unique manner using a delay tracking loop (DTL) 18 which tracks the PPM data pulses, as will now be described with references to FIGS. 2 through 6.

Figure 2:
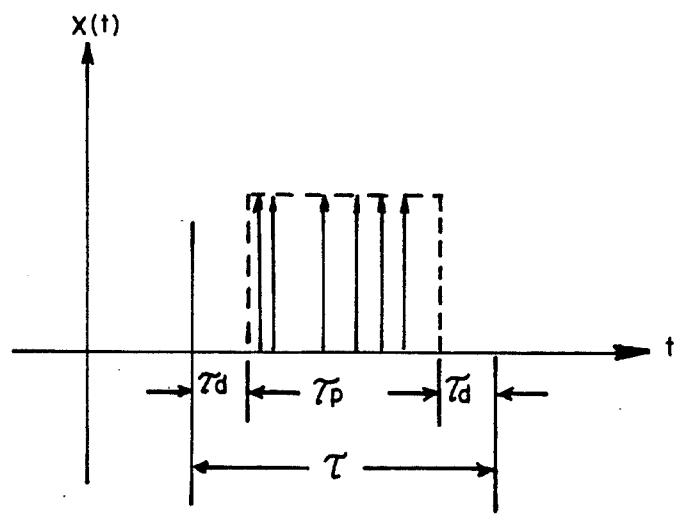
FIG. 2 illustrates the PPM format modified for this invention to provide a dead-time $\tau_d$ on each side of the pulse intervals $\tau_p$ for each data pulse slot $\tau$.
Figure 3:
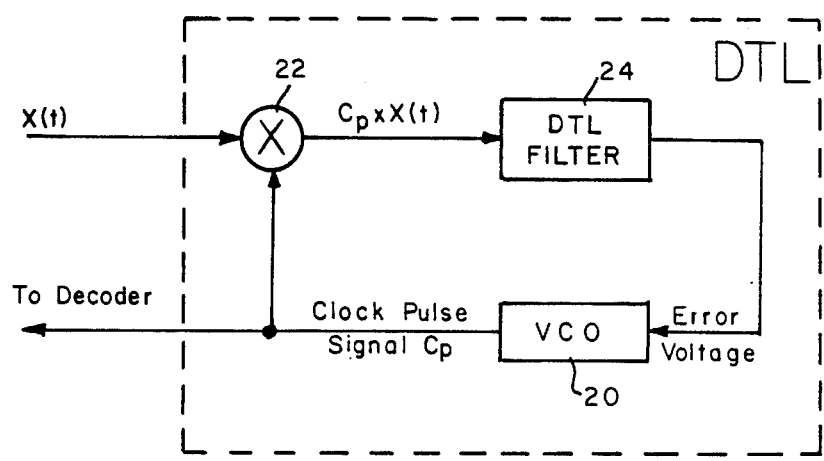
FIG. 3 is a schematic diagram of a delay tracking loop in accordance with the present invention.
Figure 5:
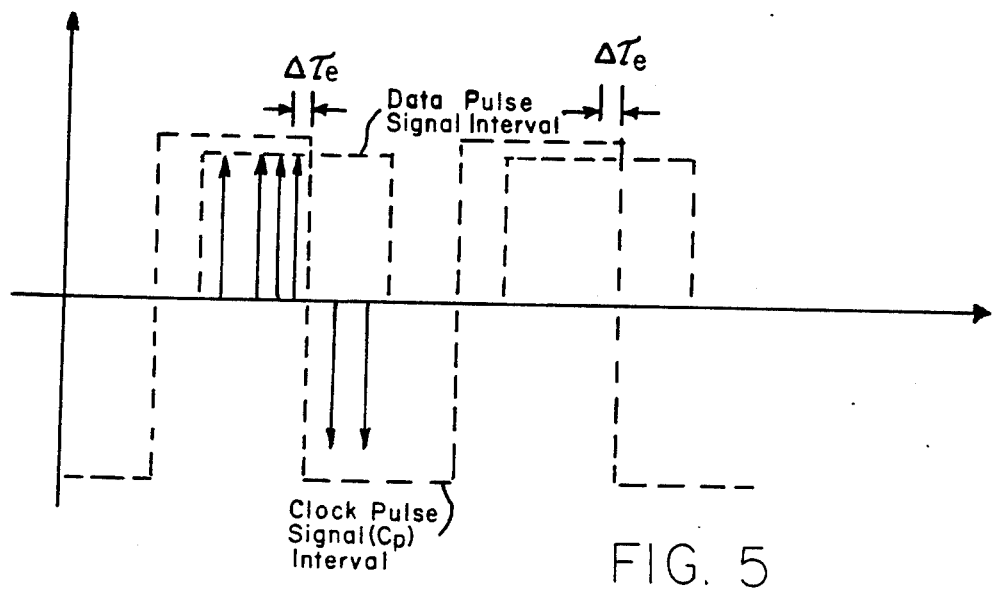
FIG. 5 illustrates the output of the multiplier in the tracking loop of FIG. 3 when there is a delay error $\Delta\tau_e$ present in the PPM tracking loop.

To achieve slot synchronization with the tracking loop, a modified PPM format shown in FIG. 2 is employed. The modification is that, whereas each data pulse slot follows right after another in the usual PPM format, for the present invention a small "dead-time" of $2\tau_d$ seconds is included between data pulse slots. If the data pulse interval is assumed to be centered in the total time $\tau$ allocated for each slot, the dead-time may be considered to be equally divided on each side of the data pulse interval. Since each data pulse transmitted consists of a random number of photons, there will be a group of impulses occurring in the data pulse period $\tau_p$, as shown in FIG. 2. The photon impulses occur randomly with a Poisson distribution. When these random impulses are multiplied by the square-wave clock signal $C_p$ derived from a voltage controlled clock generator (VCC) 20, shown in FIG. 3, the random impulses are converted to positive and negative impulses, as shown in FIG. 5.

The multiplier is shown schematically as a functional circle 22. It may be implemented by two amplifiers and an OR gate, one a noninverting amplifier gated on by a positive half cycle of the clock signal to pass uninverted the random impulses, and the other an inverting amplifier gated on by a negative half cycle of the clock pulse signal to pass inverted the random impulses during the second half of the clock pulse cycle. For simplicity of explanation, six random impulses have been illustrated throughout for each PPM data pulse, although in practice the number would be expected to vary randomly, as will their precise position in the pulse period $\tau_p$.

Figure 4:
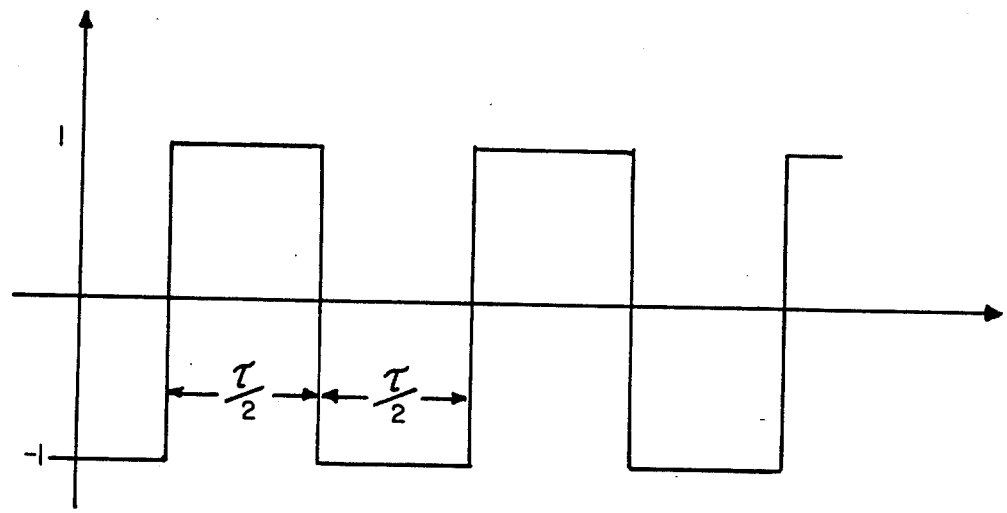
FIG. 4 illustrates the square-wave output of the voltage controlled local oscillator in the delay tracking loop of FIG. 3.

A delay tracking loop (DTL) filter 24 integrates these positive and negative impulses over a large number of PPM slot intervals so that random variations in the number of impulses that actually occur in each PPM slot will not significantly affect the accuracy of the error signal thus derived by the DTL and applied to the VCC to adjust the phase of the square-wave clock. For example, a delay error $\Delta\tau_e$ illustrated in FIG. 5 results in the hypothetical six random impulses of a PPM data pulse to be divided into four positive and two negative impulses. When these are integrated, by an integration filter of the RC "integral-control proportional plus type," there will be a net positive error signal generated by the filter to correct for the time delay error in the VCC. A tracking loop filter of this type is described by William C. Lindsey in Synchronization Systems in Communications Control, Prentice Hall (1972). See Chapter 4, Equation 4-19. A typical mechanization is shown in FIG. 4—4 of that chapter.

Figure 6:
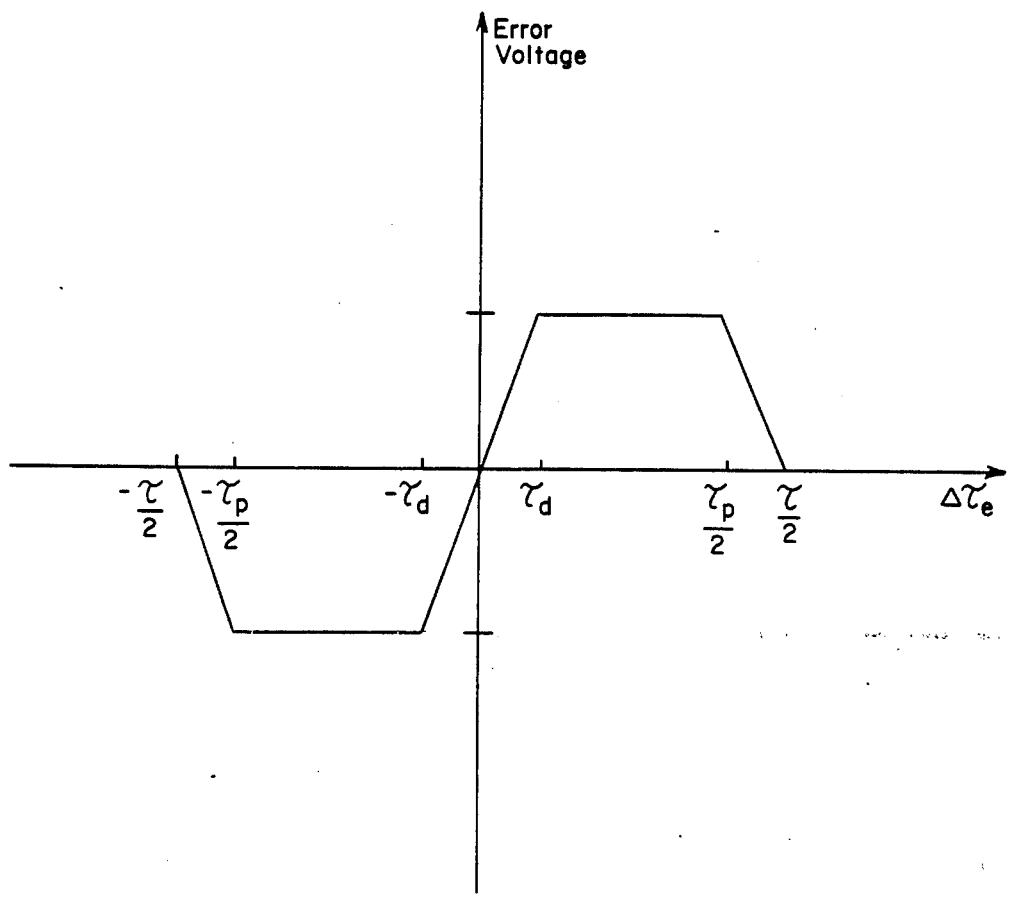
FIG. 6 illustrates the loop error curve for the PPM tracking loop.

With no delay error between the received PPM signal and the local square-wave clock, the average value of the error signal is zero, and the delay of the local square-wave clock relative to the data stream does not change. However, if any delay error begins to develop, the average value of the error signal from the DTL filter changes from zero with the correct polarity as shown in FIG. 6 to adjust the delay of the VCC relative to delay of the data stream, and thus correct the error. The square-wave clock pulse signal $C_p$, thus synchronized with the PPM data slots is applied to the decoder 16 for proper interpretation of the data transmitted within a period of M time slots.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. A method for synchronizing a receiver for a pulse position modulation channel directly from pulse position modulated data pulses received comprising the steps of transmitting pulse position modulated data over a channel said modulated data having a nominal slot time for each data pulse equal to $\tau$, and a dead time, $\tau_d$, on each side of a data pulse of a time $\tau_p$ modulated within the slot time $\tau$, and receiving at a receiver said pulse position modulated data generating a square-wave clock pulse signal having a phase and two levels at said receiver of a period nominally equal to the period of a data slot time, $\tau$, multiplying said pulse position modulated data received at said receiver by said square-wave clock pulse signal generated such that when it is of one level, the product is positive, and when it is of another level, the product is negative, integrating said positive and negative products in a delay tracking loop filter to produce an error signal proportional to the integrated difference of said positive and negative products, and adjusting the phase of said square-wave clock pulse signal proportional to the magnitude and sign of said error signal, whereby synchronization of said square-wave clock pulse signal with said data pulse slots is achieved without the use of decision aided feedback.

2. A method as defined in claim 1 wherein said pulse position modulation channel is optical and each pulse position modulated data pulse transmitted is comprised of a group of randomly occurring photons and each pulse position modulated data pulse received is detected to produce a group of random impulses of a predetermined polarity, whereby said positive product of the multiplying step is comprised of positive impulses and said negative product is comprised of negative impulses and the step of integrating said positive and negative products is comprised of integrating said positive and negative pulses by a data tracking loop filter.

3. In a receiver for an optical pulse position modulation channel having a dead time $\tau_d$ on each side of a data pulse $\tau_p$ in a data pulse slot period $\tau$, a voltage controlled clock generator for producing square-wave clock pulses of two levels with a cycle period $\tau$, means for detecting photons of an optical data pulse and producing an impulse of uniform height for each photon detected, means for multiplying said impulses with said square-wave clock pulses to produce positive impulses when said square-wave clock pulses are of one level and negative impulses when said square-wave clock pulses are of another level, and a delay tracking loop filter for integrating said negative and positive impulses for producing an error signal transmitted to said voltage controlled oscillator, whereby said delay tracking loop filter causes said oscillator to produce said square-wave clock in synchronism with said data pulse slot periods.

4. In a receiver for an optical pulse position modulation channel, the combination as defined in claim 3, wherein said means for detecting photons is comprised of a photomultiplier tube for producing an impulse for each photon of a group in a data pulse, means for amplifying to a uniform amplitude each impulse above a predetermined threshold selected to block noise and pass impulses produced by photons.

* * * * *